(12) United States Patent
Yamamura et al.

(10) Patent No.: US 8,841,033 B2
(45) Date of Patent: Sep. 23, 2014

(54) CERAMIC MATERIAL AND PREPARATION METHOD THEREFOR

(75) Inventors: Yoshihiko Yamamura, Nagoya (JP); Tatsuya Hattori, Nagoya (JP); Toshihiro Yoshida, Nagoya (JP); Akihiko Honda, Aichi-ken (JP); Yosuke Sato, Hashima (JP)

(73) Assignee: NGK Insulators, Ltd., Nayoga (JP)

( * ) Notice: Subject to any disclaimer, the term of this patent is extended or adjusted under 35 U.S.C. 154(b) by 263 days.

(21) Appl. No.: 12/873,393

(22) Filed: Sep. 1, 2010

(65) Prior Publication Data
US 2011/0053002 A1 Mar. 3, 2011

(30) Foreign Application Priority Data

Sep. 3, 2009 (JP) .................................. 2009-203760
Aug. 31, 2010 (JP) .................................. 2010-194666

(51) Int. Cl.
| | | |
|---|---|---|
| H01M 6/18 | (2006.01) |
| H01M 10/0562 | (2010.01) |
| H01M 6/04 | (2006.01) |
| C04B 35/00 | (2006.01) |
| C01G 33/00 | (2006.01) |
| C04B 35/486 | (2006.01) |
| H01M 10/052 | (2010.01) |
| C01G 35/00 | (2006.01) |

(52) U.S. Cl.
CPC ......... *C01G 33/006* (2013.01); *H01M 10/0562* (2013.01); *C01P 2006/40* (2013.01); *C04B 2235/3251* (2013.01); *C04B 2235/3203* (2013.01); *C04B 2235/3217* (2013.01); *C04B 35/486* (2013.01); *C04B 2235/322* (2013.01); *C04B 2235/3227* (2013.01); *Y02E 60/122* (2013.01); *H01M 2300/0071* (2013.01); *C04B 2235/764* (2013.01); *H01M 10/052* (2013.01); *C01P 2002/72* (2013.01); *C01G 35/006* (2013.01); *C04B 2235/77* (2013.01)
USPC ........... 429/322; 429/321; 429/304; 429/188; 501/134

(58) Field of Classification Search
None
See application file for complete search history.

(56) References Cited

U.S. PATENT DOCUMENTS

| 2005/0252853 | A1 | 11/2005 | Berland et al. |
| 2007/0148553 | A1* | 6/2007 | Weppner ........................ 429/322 |

(Continued)

FOREIGN PATENT DOCUMENTS

| CA | 2 694 259 | 1/2009 |
| CN | 101014540 | 8/2007 |

(Continued)

OTHER PUBLICATIONS

Murugan, Ramaswamy, et al. "*Fast Lithium Ion Conduction in Garnet-Type $Li_7La_3Zr_2O_{12}$*," Angew. Chem. Int. Ed. 2007, 46, pp. 7778-7781.

(Continued)

*Primary Examiner* — Yoshitoshi Takeuchi
(74) *Attorney, Agent, or Firm* — Burr & Brown, PLLC

(57) ABSTRACT

The present invention provides a ceramic material capable of demonstrating compactness and Li ion conductivity to an extent that enables the use of the ceramic material as a solid-state electrolyte material for a lithium secondary battery, or the like. A ceramic material containing Li, La, Zr, Nb and/or Ta, as well as O and having a garnet-type or garnet-like crystal structure is used.

6 Claims, 4 Drawing Sheets

(56) References Cited

U.S. PATENT DOCUMENTS

| | | | |
|---|---|---|---|
| 2008/0265718 A1 | 10/2008 | Sakashita et al. | |
| 2009/0311605 A1 | 12/2009 | Visco et al. | |
| 2010/0047063 A1 | 2/2010 | Kulkarni et al. | |
| 2010/0047696 A1 | 2/2010 | Yoshida et al. | |
| 2010/0203383 A1* | 8/2010 | Weppner | 429/209 |
| 2011/0053002 A1 | 3/2011 | Yamamura et al. | |
| 2011/0133136 A1 | 6/2011 | Weppner et al. | |
| 2011/0244337 A1* | 10/2011 | Ohta et al. | 429/319 |

FOREIGN PATENT DOCUMENTS

| | | | |
|---|---|---|---|
| CN | 101239824 | | 8/2008 |
| CN | 101295762 | | 10/2008 |
| CN | 101454477 | | 6/2009 |
| CN | 102308425 A | | 1/2012 |
| EP | 2 037 527 A1 | | 3/2009 |
| EP | 2 159 867 A1 | | 3/2010 |
| JP | H02-250264 | | 10/1990 |
| JP | H11-001323 | | 1/1999 |
| JP | 2005-166685 | | 6/2005 |
| JP | 2007-528108 | | 10/2007 |
| JP | 2008-112724 | | 5/2008 |
| JP | 2010-045019 | | 2/2010 |
| JP | 2010-176941 | | 8/2010 |
| JP | 2010-202499 | | 9/2010 |
| JP | 2010-534383 | | 11/2010 |
| JP | 2010-272344 | | 12/2010 |
| JP | 2011-051800 | | 3/2011 |
| JP | 2011-051855 | | 3/2011 |
| JP | 2011-073962 | | 4/2011 |
| WO | 2005/085138 | | 9/2005 |
| WO | WO 2009/003695 | * | 1/2009 ............ C04B 35/486 |
| WO | 2010/090301 A1 | | 8/2010 |
| WO | WO 2010/090301 | * | 8/2010 .......... H01M 10/562 |

OTHER PUBLICATIONS

Venkataraman Thangadurai, et al., "*Novel Fast Lithium Ion Conduction in Garnet-Type $Li_5La_3M_2O_{12}$ (M=Nb, Ta)*," Journal of American Ceramic Society, vol. 86, No. 3, Jan. 1, 2003, pp. 437-440.

Venkataraman Thangadurai, et al., "*Effect of Sintering on the Ionic Conductivity of Garnet-Related Structure $Li_5La_3Nb_2O_{12}$ and In- and K-doped $Li_5La_3Nb_2O_{12}$*," Journal of Solid State Chemistry, vol. 179, No. 4, Apr. 1, 2006, pp. 974-984.

U.S. Appl. No. 12/873,400, filed Sep. 1, 2010, Kanamura et al.

U.S. Office Action, U.S. Appl. No. 12/873,400, dated Sep. 20, 2012.

Final Office Action, U.S. Appl. No. 12/873,400, dated Feb. 15, 2013 (10 pages).

Lu, Cheng-Zhang. "*Electrochemical performance of $LiCoO_2$ cathodes by surface modification using lanthanum aluminum garnet*," Journal of Power Sources 184. May 13, 2008, pp. 392-401.

Chinese Office Action, Chinese Application No. 201010277435.2, dated May 6, 2013 (8 pages).

Japanese Office Action, (with English Translation) Japanese Patent Application No. 2010-194666, dated Apr. 30, 2013 (6 pages).

Japanese Office Action, (with English Translation) Japanese Patent Application No. 2010-194671, dated May 21, 2013 (4 pages).

Chinese Office Action, Chinese Application No. 201010277435.2, dated Jun. 18, 2014 (6 pages).

* cited by examiner under the Japanese Patent Application

CERAMIC MATERIAL AND PREPARATION METHOD THEREFOR

CROSS-REFERENCE TO RELATED APPLICATIONS

This application claims priority to Japanese Patent Application No. 2009-203760 filed on Sep. 3, 2009 and Japanese Patent Application No. 2010-194666 filed on Aug. 31, 2010, the contents of which are hereby incorporated by reference into the present application.

BACKGROUND OF THE INVENTION

1. Field of the Invention

The present invention relates to a ceramic material and a method for producing therefor; in particular, it relates to a ceramic material for solid-state electrolyte applicable to various secondary batteries such as lithium ion secondary battery and air secondary battery, and to a method for producing therefor.

2. Description of Related Art

In recent years, with the development of portable devices such as personal computers and mobile phones, there has been rapidly increasing demand for secondary batteries usable as a power source thereof. In cells of the secondary batteries used in such applications, a liquid electrolytes (an electrolytic solution) containing a combustible organic diluent solvent are commonly used as an ion transfer medium. In batteries using such electrolytic solution, there is the possibility that problems such as leaking of the electrolyte solution, ignition, explosion and the like may occur.

Thus, from the point of view of ensuring safety intrinsically, advances are being made in the development of all-solid-state secondary batteries, in which solid-state electrolytes are used in place of liquid electrolytes, while at the same time, all battery elements are constituted by solids. Such all-solid-state secondary batteries have the advantages in that, there is no danger of ignition or leakage due to being ceramics sintered with electrolytes, and moreover, problems such as deterioration of the battery capability due to corrosion do no occur readily. Among these, all-solid-state lithium secondary batteries using lithium metals for the electrodes are believed to be secondary batteries that can easily be given a high energy density.

In addition, in order to improve the battery performance of a secondary battery, the keys thereof are the enlargement of the difference in electric potential between the materials used for the positive electrode and the negative electrode, and the improvement of the volume density of each material used in the positive and negative electrodes. In particular for negative electrode materials, it is known that using Li metals or Li alloys has an important contribution to improving the battery performance. However, Li metals in the negative electrode, sometimes causes the phenomenon of precipitation of dendrite which is a whisker like crystalline along with charge-discharge behavior, penetrates the separator and causes a short inside the battery at the worst. Therefore, Li metals could not be used for the negative electrode due to safety issues. In an all-solid-state battery in which the electrolyte portion is formed by a solid-state electrolyte, since deposits cannot penetrate the solid-state electrolyte, it is anticipated to be usable safely. However, since this Li metal has high reactivity and lowest electric potential, so a useable solid-state electrolyte comprising a ceramic material has not been discovered heretofore.

In recent years, it has been reported that $Li_7La_3Zr_2O_{12}$ (hereinafter referred to as LLZ), a ceramic material of the garnet-type, had excellent lithium resistance, and that there was a possibility of being usable as a solid-state electrolyte for an all-solid-state Li secondary battery (see Ramaswamy Murugan et al., Angew. Chem. Int. Ed. 2007, 46, 1-5).

However, when the present inventors attempted to produce a LLZ pellet based on Ramaswamy Murugan et al., Angew. Chem. Int. Ed. 2007, 46, 1-5, a LLZ pellet usable as a solid-state electrolyte for an all-solid-state lithium secondary battery could not be obtained, and the material did not qualify as being practically usable as a solid-state electrolyte material for an all-solid-state lithium secondary battery.

SUMMARY Of THE INVENTION

Thus, an objective of the present invention is to provide a ceramic material capable of demonstrating compactness and conductivity to an extent that enables the use of the ceramic material as a solid-state electrolyte material for a secondary battery, or the like, and a method for producing therefor. In addition, another object of the present invention is to provide a practical secondary battery using such a ceramic material.

The present inventors have variously examined the composition of LLZ based ceramics and obtained the finding that a satisfactory Li ion conductivity could be obtained by substituting in a LLZ based ceramics a portion of Zr with niobium (Nb) and/or tantalum (Ta). According to the present invention, the following means are provided.

According to the present invention, a ceramic material containing Li, La, Zr, Nb and/or Ta, and O and having a garnet-type or garnet-like crystal structure is provided. That is to say, the present ceramic material can have any combination from (a) to (c) below:

(a) Li, La, Zr, Nb, O
(b) Li, La, Zr, Ta, O
(c) Li, La, Zr, Nb, Ta, O

The ceramic material may be a sintered body. In addition, the sintered body may contain Al. In addition, it is preferable that the ceramic material contains a Li constituent, a La constituent, a Zr constituent, a Nb constituent and/or a Ta constituent at molar ratios that allow a garnet-type or garnet-like crystal structure to be obtained, and that the molar ratio (Nb+Ta)/La is 0.03 or greater to 0.20 or lower. In addition, when Al is contained, it is preferable that the molar ratio Al/La is 0.008 or greater to 0.12 or lower. In addition, it is also preferable that the molar ratio (Zr+Nb+Ta)/La is 0.67.

According to the present invention, a ceramic material that is a solid-state electrolyte material having Li ion conductivity is also provided.

According to the present invention, a method for producing a ceramic material, comprising the step of synthesizing a ceramic material containing Li, La, Zr, Nb and/or Ta, Al as well as O and having a garnet-type or garnet-like crystal structure by firing raw materials containing a Li constituent, a La constituent, a Zr constituent, a Nb constituent and/or a Ta constituent as well as an Al constituent.

In the production process of the present invention, the synthesis step can comprise a first heat treatment step whereby a primary firing powder containing at least Li, La, Zr, Nb and/or Ta as well as O is obtained, and a second heat treatment step whereby the primary firing powder is fired in the presence of Al constituent to obtain the ceramic material. In addition, the second heat treatment step can be a step whereby a sintered compact of the primary firing powder is fired to be sintered. In addition, the synthesis of the ceramic material can also be performed in an inert gas atmosphere.

According to the present invention, a secondary battery is provided, which is a lithium secondary battery, comprising a positive electrode, a negative electrode and a solid-state electrolyte containing a ceramic material containing Li, La, Zr, Nb and/or Ta, Al as well as O and having a garnet-type or garnet-like crystal structure.

DETAILED DESCRIPTION OF THE INVENTION

DETAILED DESCRIPTION OF INVENTION

Figure 1:
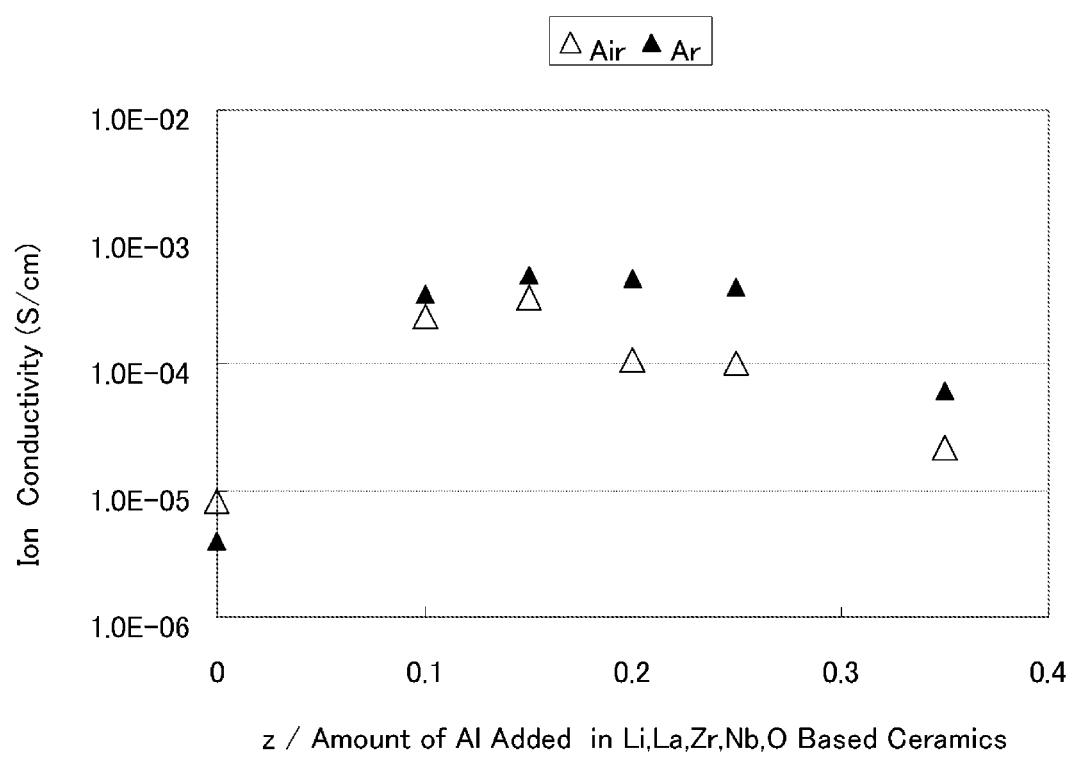
FIG. 1 shows the evaluation results for the dependencies on the amount of Al added and firing atmosphere in an Li—La—Zr—Nb—Al based ceramics.

The present invention relates to ceramic material and production process therefor as well as use thereof. The ceramic material of the present invention is a complex oxide based ceramic material containing Li, La, Zr, Nb and/or Ta, as well as O and having a garnet-type or garnet-like crystal structure. Further, the ceramic material of the present invention is a sintered body of complex oxide based ceramics containing Al in addition to the above-mentioned constituents and having the crystal structure mentioned above. According to these materials, a sintered body can be obtained with satisfactory sinterability (sintered body density) and ion conductivity. Consequently, a ceramic material can be obtained, having excellent resistance to lithium, which can be used in a solid-state electrolyte appropriate for various secondary batteries such as air secondary batteries and LiS batteries, in addition to applications in lithium secondary batteries using a liquid electrolytes, to begin with all-solid-state lithium secondary batteries.

Li—La—Nb complex oxide and complex oxide of Li—La—Ta both demonstrate low Li ion conductivities in the $10^{-6}$ S/cm order (Journal of the American Ceramic Society, Vol. 86, No. 3,437, (2003)). With such a background, improvement of Li ion conductivity cannot be anticipated normally by substituting in LLZ a portion of Zr with Nb and/or Ta; however, the present inventors discovered that ion conductivity improves by substituting a portion of Zr with these elements, contrary to expectations.

In addition, according to the method for producing of the present invention, such a ceramic material can be produced stably. In addition, according to the all-solid-state lithium secondary battery of the present invention, an all-solid-state lithium secondary battery with excellent resistance to lithium is provided.

Hereafter, first, the ceramic material of the present invention and method for producing therefor will be described, and the all-solid-state lithium secondary battery using the ceramic material as a solid-state electrolyte material will be described.

(Ceramic Material)

The ceramic material of the present invention is a complex oxide based ceramic material containing Li, La, Zr, Nb and/or Ta, as well as O. By substituting a portion of Zr in LLZ with either one or both of Nb and Ta, conductivity can be improved compared to prior to substitution.

The substitution ratio (molar ratio) of Zr by Nb and/or Ta can be set suitably so as to obtain satisfactory sintered body density and conductivity, by taking into consideration firing conditions and the like, as well. For instance, as described below, when preparing raw materials containing a Li constituent, a La constituent, a Zr constituent, a Nb constituent and/or a Ta constituent so as to obtain a ceramic material with a garnet-type or garnet-like crystal structure, it is preferable that the amount of substitution (molar ratio) of Zr by Nb and/or Ta is such that the molar ratio (Nb+Ta)/La is 0.03 or greater to 0.20 or lower. In this range, satisfactory sinterability and Li ion electric conductivity can be obtained. Note that Nb+Ta represents the mole total of Nb and Ta, represents the mole total of Nb when only Nb is contained, and represents the mole total of Ta when only Ta is contained. In addition, when the garnet-type or garnet-like crystal structure is considered, it is preferable that the molar ratio (Zr+Nb+Ta)/La is 0.67. Note that such ranges of ratio are also applied to both raw materials and sintered body.

Such composition (molar ratios) of constitutive metal elements can be applied to the starting raw materials, for instance, as follows: that is to say, when the LLZ based ceramic composition ($Li_7La_3Zr_2O_{12}$) is applied to the present ceramic material to yield $Li_aLa_bZr_xM_yO_c$ (where M represents Nb and/or Ta and y represents the total number of moles of Nb and Ta), the molar ratios of the constitutive metal elements containing Nb and Ta can be set to be a:b:x+y:y =7:3:2:0.1 or greater to 0.6 or lower.

In addition, the ceramic material of the present invention can contain Al. According to the present inventors, it was revealed that, owing to the fact that the present ceramic material contains Al, a ceramic material having an LLZ crystal structure can be acquired as a compact sintered body pellet, and as a result, Li ion conductivity improves as well.

It suffices that the ceramic material of the present invention can be verified to have a single phase LLZ crystal structure, regardless of the morphology thereof. That is to say, in addition to a powder morphology, formed compact and sintered body may be given. When the present ceramic material is powder or a formed compact thereof, Al may be contained, although Al may not have to be contained. When the present ceramic material is a sintered body, the ability to verify a single phase LLZ crystal structure at the same time as the ability to verify that Al is contained are preferable. The form in which Al is present does not matter in particular. Al is thought to contribute to the compaction of the sintered body. Al is known to be present at least in a sintered body inside the crystal grain thereof. Al in the ceramic material of the present invention can be detected by, for instance, ICP (radio frequency inductively coupled plasma) emission spectrometric analysis, EPMA (electron probe micro analyzer), and the like, and in addition, the content thereof can be determined.

It is preferable that the content of Al in the present ceramic material is in a range that allows improvement of sinterability (density of sintered body) and/or Li conductivity. More preferably, it is contained in a range that allows an LLZ crystal structure to be obtained when obtaining a sintered body from the present ceramic material. With regard to an aluminum content allowing such characteristic improvement or the like to be obtained, a person skilled in the art can determine readily the required addition amount or content of aluminum, for instance, by performing a firing step in the presence of a suitable amount of Al constituent with respect to the Li constituent, La constituent, Zr constituent as well as Nb constituent and/or Ta constituent mixed at LLZ theoretical amount ratios and appropriate molar ratios based on the theoretical amount ratios, obtaining a sintered body, and measuring the characteristics and the crystal structure thereof.

The amount of Al added to starting raw materials other than Al is set suitably so that satisfactory sintered body density and conductivity are obtained, taking firing condition or the like into consideration as well. For instance, when a raw material containing a Li constituent, a La constituent, a Zr constituent, a Nb constituent and/or a Ta constituent is readied in order to obtain a ceramic material having a garnet-type or garnet-like crystal structure, the preferable amount of Al added is such that the molar ratio Al/La is 0.008 or greater to 0.12 or lower in the raw material. It is known that when such a raw material is fired, improved density and Li conductivity are obtained. More preferably, Al/La is 0.10 or lower. Note that, these ratio ranges are also applied to the obtained sintered body.

Such composition (molar ratios) of constitutive metal elements can be applied to the starting raw materials, for instance, as follows: that is to say, when the LLZ based ceramic ($Li_7La_3Zr_2O_{12}$) is applied to the present ceramic material to yield $Li_aLa_bZr_xM_yO_c$-zAl (where M represents Nb and/or Ta and v represents the total number of moles of Nb and Ta), the molar ratios of the constitutive etal elements can be set to be a:b:x+y:z=7:3:2:0.025 or greater to 0.35 or lower. Preferably, they can be set to be a:b:x+y:z =7:3:2:0.025 or greater to 0.30 or lower.

The density of the sintered body of the present ceramic material is calculated, for instance, by measuring the weight and volume of the sintered body pellet. For instance, in the case of a cylindrical pellet, it is preferable to measure by a method whereby the weight is measured, then the diameter is measured at several locations with a micrometer to yield a mean value, the thickness is also measured similarly at several locations with a micrometer to yield a mean value, the volume is calculated from these numerical values, and the density is measured from the respective values, or a method whereby equivalent accuracy and correctness thereto are obtained. In addition, it is preferable to measure Li ion conductivity, for instance, by the alternating current impedance method or a method whereby equivalent accuracy and correctness thereto are obtained.

The present ceramic material can have a LLZ crystal structure. The LLZ crystal structure that the ceramic material of the present invention has may substantially comprise Li, La, Zr, Nb and/or Ta, as well as O. While Al may be in the crystal lattice, it may also be in a grain other than a crystal lattice. In addition, as one characteristic of the LLZ crystal structure that the present ceramic material can have, the point of having an XRD diffraction pattern similar to 045-0109 ($Li_5La_3Nb_2O_{12}$), which is a powder diffraction file from the ICDD (International Centre for Diffraction Data) given below as one example of material having the same garnet-type crystal structure, may be cited. Note that, when comparing to 045-0109, since the constitutive elements are different and, in addition, there is the possibility that the Li concentration, or the like, in the ceramics is different, there are cases where diffraction angles and diffraction intensity ratios are different.

The present ceramic material may be a powder or may be a sintered body or may be a formed compact, as long as it contains Li, La, Zr, Nb and/or Ta, as well as O and has a LLZ crystal structure. For instance, as a solid-state electrolyte of an all-solid-state lithium secondary battery or the like, being a sintered body containing Al is preferable. As a ceramic material for obtaining a solid-state electrolyte in which another substance is mixed, being a powder is preferable.

The present ceramic material containing aluminum and improving sinterability (density) and/or Li ion conductivity in a sintered body can have lithium ion conductivity, which can be used as a solid-state electrolyte. Consequently, the ceramic material of the present invention is preferable broadly as a solid-state electrolyte material, and is preferable particularly as a solid-state electrolyte material for an all-solid-state lithium secondary battery. In addition, the ceramic material of the present invention can be used preferably in gas sensor materials that use conductivity, such as, NOx sensor, SOx sensor, carbon dioxide sensor and oxygen sensor.

For the present ceramic material, it is preferable that the Li ion conductivity thereof is $3.0 \times 10^{-5}$ S/cm or greater, more preferably $5.0 \times 10^{-5}$ S/cm or greater, and even more preferably $1.0 \times 10^{-4}$ S/cm or greater. All the more preferably, it is $3.0 \times 10^{-4}$ S/cm or greater, furthermore $4.0 \times 10^{-4}$ S/cm, and furthermore $5.0 \times 10^{-4}$ S/cm. For the present ceramic material, it is preferable that the density thereof is 4.0 or greater, more preferably 4.5 or greater, and even more preferably 4.8 or greater.

Note from what has been described above that a solid-state electrolyte containing the present ceramic material can be obtained according to the description herein. The solid-state electrolyte containing the present ceramic material can be used as a solid-state electrolyte for various applications. It is preferable in particular as a solid-state electrolyte of an all-solid-state lithium secondary battery. In addition, the solid-state electrolyte containing the present ceramic material can, for instance, by substitute for the separator portion or by superimpose on the separator of an ordinary lithium ion secondary battery that uses electrolyte solutions, separate the electrolyte solutions on the positive electrode side and the negative electrode side completely.

In addition, it is possible to substitute at least a portion of the separator with the present ceramic material, for instance, in a battery that uses sulfur in the positive electrode (for instance, LiS battery in combination with a negative electrode Li). It is known that with a LiS battery that uses electrolyte solutions, during battery operation, positive electrode polysulfide elutes into the electrolyte solution, and if this reaches the negative electrode side, it cause a battery capacity decrease. As a result, separation of e the electrolyte solutions of the positive and negative electrodes completely is a method for solving the cause of such a battery capacity decrease.

In addition, the solid-state electrolyte containing the present ceramic material can also be applied to air secondary batteries. That is to say, at least a portion of the liquid form electrolyte of an air secondary battery can be substituted with the solid-state electrolyte containing the present ceramic material. According to such a format, realization of a structure that can avoid or suppress the use of an organic electrolyte solution can be expected, allowing the battery structure to be simplified while at the same time secondary reactions caused by an organic electrolyte solution to be suppressed.

(The Method for Producing the Ceramic Material)

The method for producing the ceramic material described herein (hereafter referred to as the present preparation method) includes the step of synthesizing a ceramic material containing Li, La, Zr, Nb and/or Ta, Al as well as O and having an LLZ crystal structure by firing raw materials containing a Li constituent, a La constituent, a Zr constituent, a Nb constituent and/or a Ta constituent as well as an Al constituent. According to the present preparation method, a ceramic powder or sintered body can be obtained readily, allowing a sintered body provided with handleable sinterability (density) and satisfactory Li ion conductivity to be obtained.

(Preparation of Raw Materials)

A Li constituent, a La constituent, a Zr constituent as well as a Nb constituent and/or a Ta constituent, and furthermore, an Al constituent, may be given as raw materials of the present ceramic material used in the present preparation method. In addition, an O constituent may be given. Note that the O constituent is contained as a constitutive element of oxides, hydroxides, various salts and the like, of these constitutive metal elements. In one embodiment of the present invention, the raw materials may further contain an O constituent. More concretely, at least one constituent including any of a lithium (Li) constituent, a lanthanum (La) constituent and a zirconium (Zr) may contain an oxygen (O) constituent. In a further embodiment, the raw materials may not contain an oxygen (O) constituent. In either case, the present ceramic material containing Li, La, Zr, Nb and/or Ta, Al, as well as O can be obtained by firing the raw materials in the synthesis step according to an appropriate method, for instance, setting an appropriate firing atmosphere, or the like.

(Li Constituent, La Constituent, Zr Constituent as Well as Nb Constituent and/or Ta Constituent)

These various constituents may be used by suitably selecting various metal salts, such as metal oxide, metal hydroxide and metal carbonate, containing the respective metal constituents, with no particular limitation. For instance, using $Li_2CO_3$ or LiOH as the Li constituent, using La(OH)$_3$ or $La_2O_3$ as the La constituent, and using $ZrO_2$ as the Zr constituent are possible. It is possible to use $Nb_2O_5$, $NbCl_5$, Nb, niobium alkoxide including propoxy niobium or the like as the Nb constituent is possible. It is possible to use $Ta_2O_5$, $TaCl_5$, Ta, tantalum alkoxide including tantalum ethoxide or the like as the Ta constituent.

With regard to these constituents in the raw materials for obtaining the present ceramic material, for instance, it is possible to blend a Li constituent, a La constituent, a Zr constituent, as well as a Nb constituent and/or a Ta constituent so as to yield a theoretical amount ratio such that Nb and/or Ta replaces a portion of Zr in $Li_7La_3Zr_2O_{12}$ (LLZ) described in Ramaswamy et al.,. That is to say, according to the stoichiometric composition of LLZ, the Li constituent, the La constituent, the Zr constituent as well as the Nb constituent and/or the Ta constituent can be used at Li constituent:La constituent:Zr constituent as well as Nb constituent and Ta constituent=7:3:2 or with a composition that is close to this composition. In blending each constituent, the amount of Li constituent may be increased by up to approximately 10%, taking into account the volatilization of Li during heat treatment. In addition, it is known in the present ceramic material that since losses and the like occur at grinding and recovery time of the synthetic powder, there are cases where each of the elements Li, La, Zr, Nb and/or Ta, as well as O deviates from the composition of the chemical formula in Ramaswamy Murugan et al.,. Note that when describing herein the raw material composition or the like of the present ceramic material based on the composition of LLZ based ceramics, regarding the constitutive element ratios, as described above, Li constituent:La constituent:Zr constituent as well as Nb constituent and Ta constituent=7:3:2 or a composition that is close to this composition can be used, and in addition, in blending each constituent, the amount of Li constituent may be increased by up to approximately 10%, taking into account the volatilization of Li during heat treatment.

For instance, when preparing raw materials containing a Li constituent, a La constituent, a Zr constituent, a Nb constituent and/or a Ta constituent, the amount of Zr substituted by Nb and/or Ta can be determined as has been described already. That is to say, it is preferable that the amount of Zr substituted by Nb and/or Ta is adjusted such that the molar ratio (Nb+Ta)/La is 0.03 or greater to 0.20 or lower in the raw materials. Since La is an element that is hardly lost in the synthesis step of the ceramic material of the present invention, by setting the amount of Nb and/or Ta added in molar ratio with respect to La, it can be used as a suitable index for characterizing the final product, the present ceramic material. In addition, when the LLZ based ceramic composition ($Li_7La_3Zr_2O_{12}$) is applied to the present ceramic material to yield $Li_aLa_bZr_xM_yO_c$-zAl (where M represents Nb and/or Ta and y represents the total number of moles of Nb and Ta), the molar ratios of the constitutive metal elements can be set to be a:b:x+y:y =7:3:2:0.1 or greater to 0.6 or lower. In addition, when the garnet-type or garnet-like crystal structure is considered, it is preferable that the molar ratio (Zr+Nb+Ta)/La is 0.67.

(Al Constituent)

Without being limited in particular, the Al constituent can be selected suitably and various metal salts such as metal oxides, metal hydroxides, metal nitrates, metal organic compounds, individual metals, which contain Al. For instance, $Al_2O_3$, $Al(NO_3)_3.9H_2O$, $Al(OH)_3$, Al, aluminum acetylacetonate, aluminum triethoxide, aluminum butoxide, aluminum propoxide, aluminum methoxide, aluminum chloride, aluminum chloride hexahydrate, diethyl aluminum chloride, aluminum oleate, aluminum acetate n-hydrate, aluminum oxalate, aluminum bromide hexahydrate, aluminum stearate, triethyl aluminum, trimethyl aluminum, triisobutyl aluminum, aluminum sulfate, aluminum iodide and the like can be used. The Al constituent is made to be present with respect to the Li constituent, the La constituent and the Zr constituent in a range that allows improvement in sinterability and conductivity to be obtained by the inclusion of Al. In addition, it is blended preferably in a range that allows an LLZ crystal structure to be obtained in the ceramic material of the present invention.

As has been described already, for a person skilled in the art, such an amount of Al constituent can be acquired by performing the synthesis step in the presence of various amounts of Al constituent with respect to the components of the ceramic material of the present invention to obtain a sintered body, and measuring conductivity or the like. For instance, the preferable amount of Al added in the raw materials is such that the molar ratio Al/La is 0.008 or greater to 0.12 or lower, and the more preferable amount of Al added is such that the molar ratio Al/La is 0.10 or lower. Since La is an element that is hardly lost in the synthesis step of the ceramic material of the present invention, by setting the amount of Al added in molar ratio with respect to La, it can be used as a suitable index for characterizing the final product, the present ceramic material. More concretely, when the LLZ based ceramic composition ($Li_7La_3Zr_2O_{12}$) is applied to the present ceramic material to yield $Li_aLa_bZr_xM_yO_c$-zAl (where M represents Nb and/or Ta and y represents the total number of moles of Nb and Ta), the molar ratios of the constitutive metal elements containing Al may be set to be a:b:x+y:z =7:3:2: 0.025 or greater to 0.35 or lower. More preferably, they may be set to be a:b:x+y:z =7:3:2:0.025 or greater to 0.30 or lower. Note that, in addition to cases where the molar ratios of the elements in the raw materials is obtained in the ceramic material obtained ultimately, in cases where losses during grinding and recovery of synthetic powder, volatilization of a specific element during firing and the like occur, they may not be maintained in the ultimately obtained ceramic material. Note that, the Al constituent as one constituent of firing raw materials and the supply format thereof will be described in detail subsequently.

These respective constituents can be used without particular limitation as long as they are industrially produced and available. Preferably, the purity is 95% or greater, and more preferably 98% or greater. In addition, moisture is preferably 1% or lower, and drying may be performed as necessary.

In addition, in preparing the raw materials, raw material powder preparation methods that are well known in the synthesis of ceramic powders can be adopted suitably. For instance, loading into an automatic mortar and pestle or the like, adequate ball mill or the like, and homogeneously mixing is possible.

(Synthesis Step)

The present preparation method can comprise the step of synthesizing the present ceramic material by firing a raw material containing a Li constituent, a La constituent, a Zr constituent, a Nb constituent and/or a Ta constituent, as well as an Al constituent. This synthesis step may synthesize the present ceramic material from the raw material containing these constituents at once, or may synthesize through a plurality of steps. The synthesis method may adopt various well known ceramics synthesis methods. While the firing temperature for the synthesis is not limited in particular, it is preferably 800° C. or higher, and more preferably, it is preferable to perform heat treatment at temperatures that are 850° C. or higher to 1250° C. or lower. While the firing atmosphere is not limited in particular, it may be an oxidizing atmosphere containing oxygen or an inert atmosphere comprising an inert gas such as Ar.

The synthesis step may be one that combines two or more heat treatment steps. That is to say, the synthesis step can comprise a first heat treatment step of obtaining a primary firing powder containing at least Li, La, Zr, Nb and/or Ta, as well as O, and a second heat treatment step of firing the primary firing powder in the presence of an Al constituent to obtain the ceramic material. Obtaining a LLZ crystal structure is facilitated by such a combination of heat treatment steps.

The synthesis step of the ceramic material of the present invention may be performed in an inert gas atmosphere. In synthesizing the ceramic material of the present invention, higher density and Li ion conductivity are obtained by heat treatment in an inert gas atmosphere. When performing heat treatment in an inert gas atmosphere, it is preferable that the raw material is a powder of oxide or the like. Accordingly, between the first heat treatment step and the second heat treatment step described below, it is preferable that the second heat treatment step is carried out in an inert gas. As inert gas species, for instance, one species or two species or more selected from helium (He), neon (Ne), argon (Ar), nitrogen (N), krypton (Kr), xenon (Xe) and radon (Rn) may be included. Preferable is Ar.

(First Heat Treatment Step)

The first heat treatment step is a step for performing thermal decomposition of at least a Li constituent, a La constituent, or the like, and obtaining a primary firing powder to facilitate the synthesis of a ceramic material in the second heat treatment step. The firing temperature is a temperature of preferably 700° C. or higher to 1150° C. or lower. The first heat treatment step may comprise a step of heating at a lower heating temperature and a step of heating at a higher heating temperature, within the temperature range mentioned above. Comprising such heating steps allows the ceramic powder to be obtained in a more homogeneous state, allowing a sintered body of a better quality to be obtained in the second heat treatment step. When performing a first heat treatment step with such plurality of steps, it is preferable to knead/grind after each heating step has ended, using an automatic mortar and pestle, a ball mill, a vibrating mill and the like. In addition, it is preferable that the grinding method be performed dry. In this way, obtaining an all the more homogeneous LLZ phase by the second heat treatment step is facilitated. Note that, depending on the conditions of the first heat treatment step, there are cases where the primary firing powder already has a LLZ crystal structure.

The first heat treatment step may be performed in an oxidizing atmosphere such as air or may be performed in an inert atmosphere. The preferable atmosphere is also different depending on the raw materials. If thermal decomposition is taken into account, oxidizing atmosphere is preferable.

It is preferable for the heating steps constituting the first heat treatment step to perform preferably a heating step at 850° C. or higher to 950° C. or lower and a heating step at 1075° C. or higher to 1150° C. or lower. Even more preferable are a heating step at 875° C. or higher to 925° C. or lower (at approximately 900° C. is more preferable) and a heating step at 1100° C. or higher to 1150° C. or lower (at approximately 1125° C. is more preferable).

It is preferable that the first heat treatment step is performed for approximately 15 hours or less overall as the total of heating time at the highest temperature set as the heating temperature. When the first heat treatment step is constituted by two heat treatment steps, it is preferable that the heating time at each highest temperature is approximately 5 to 6 hours.

Meanwhile, the first heat treatment step can be shortened by modifying the raw materials. For instance, when LiOH is used for the Li constituent, in order to obtain a LLZ crystal structure, raw materials containing the Li constituent, a La constituent, a Zr constituent as well as a Nb constituent and/or a Ta constituent can be subjected to heat treatment at 700° C. or higher to 950° C. or lower. This is because LiOH used in the raw materials forms a liquid phase at low temperatures thus reacting more readily with other raw materials at a lower temperature.

An Al constituent may be contained within the raw materials used in the first heat treatment step. When the Al constituent is contained in the raw materials, a primary firing powder containing Al can be obtained. Therefore, the Al constituent is present inside the primary firing powder even without adding separately the Al constituent to the primary firing powder in the subsequent second firing step. Consequently, in performing the second heat treatment step, the primary firing powder becomes heat-treated in the presence of the Al constituent by performing the second firing step, whereby the primary firing powder is heat-treated, even without adding separately the Al constituent.

(Second Heat Treatment Step)

The second heat treatment step can be a step in which the primary firing powder obtained in the first heat treatment step is heated at a temperature of 900° C. or higher to 1250° C. or lower. According to the second heat treatment step, the primary firing powder obtained in the first heat treatment step is fired, ultimately allowing the present ceramic material to be obtained.

It is preferable that the second heat treatment step is such that the primary firing powder is heat-treated at a temperature of 1125° C. or higher to 1250° C. or lower. By doing so, the LLZ crystal structure becomes easier to obtain. When $LiCO_3$ is used as the Li constituent, heat treatment at 1125° C. or higher to 1250° C. or lower is preferable. This is because if lower than 1125° C., a single phase of LLZ is difficult to obtain and Li ion conductivity is small, and if 1250° C. is exceeded, formation of a different phase ($La_2Zr_2O_7$ or the like) is observed, Li ion conductivity is small, and in addition, crystal growth becomes significant, such that maintaining the strength as a solid-state electrolyte tends to be difficult. From approximately 1180° C. to 1230° C. is more preferable.

Meanwhile, the second heat treatment step can be decreased in temperature by modifying the raw material constituents. For instance, when LiOH is used as the Li constituent, in order to obtain an LLZ crystal structure, the primary firing powder can be heat-treated even at temperatures of 900° C. or higher to lower than 1125° C. This is because LiOH used for the Li constituent forms a liquid phase at low temperatures thus reacting more readily with other raw material constituents at a lower temperature.

It is preferable that the heating time at the above heat temperature in the second heat treatment step is approximately 50 hours or less. This is because if the time is longer than 50 hours, in addition to the reaction with the setter becoming facilitated through the embedding powder, crystal growth is significant, such that strength as a sample cannot be maintained.

While the second heat treatment step can be performed in air atmosphere, performing in an inert gas atmosphere is preferable. High density and Li ion conductivity can be obtained by heating the primary firing powder in an inert gas atmosphere.

It is preferable to perform the second heat treatment step once the raw materials appropriate for the second heat treatment step containing the primary firing powder have been pressure-formed using a well known press method into a formed compact that has been conferred a desired three-dimensional shape (for instance, shape and size usable as a solid-state electrolyte of an all-solid-state secondary battery). Forming of the compact not only accelerates the solid phase reaction, but also facilitates obtaining a compact sintered body. Note that after the second heat treatment step, the ceramic powder obtained in the second heat treatment step may be formed into the compact and a sintering step may be performed separately at similar temperatures to the heating temperature in the second firing step.

When firing and sintering the formed compact containing the primary firing powder in the second firing step, a preferable performance is by embedding the formed compact in the same powder. Doing so suppresses the loss of Li, and can suppress an alteration of the composition before and after the second firing step. In addition, by holding the formed compact from above and underneath with setters as necessary, warping of the sintered body at firing time can be prevented.

Meanwhile, when the second heat treatment step is decreased in temperature by using LiOH as the Li constituent, or the like, the formed compact of the primary firing powder can be sintered even without being embedded in the same powder. This is because the loss of Li is suppressed relatively due to the second heat treatment step being decreased in temperature.

In order to perform the second heat treatment step in the presence of the Al constituent, in addition to the mode of performing the first heat treatment step in the presence of an Al constituent and using the obtained primary firing powder as-is in the second heat treatment step, the mode of performing the first heat treatment step in the absence of the Al constituent, adding and mixing the Al constituent with the obtained primary firing powder and performing the second heat treatment step may be given. To perform the second heat treatment step in the presence of the Al constituent, either of these modes may be adequate, or these modes may be combined suitably. Preferably, the Al constituent is present in the second heat treatment step, in particular in a step that accompanies sintering. Doing so allows satisfactory sinterability and ion conductivity to be obtained.

According to the above synthesis step, the present ceramic material can be obtained. In addition, as far as the present ceramic material, it can be obtained as a powder or sintered body or the like. With the method for producing the present ceramic material, since sinterability is improved, the heating temperature is also lower compared to prior art, allowing the energy costs for obtaining a solid-state electrolyte material for an all-solid-state lithium secondary battery to be decreased. In addition, the present ceramic material can be obtained with certainty by performing the first heat treatment step and the second heat treatment step.

(All-Solid-State Lithium Secondary Battery)

The all-solid-state lithium secondary battery described herein (hereafter simply referred to as the present secondary battery) can be provided with a positive electrode, a negative electrode and a solid-state electrolyte containing Li, La, Zr, Nb and/or Ta, Al and O and having a LLZ crystal structure. The present secondary battery is provided with a solid-state electrolyte having excellent resistance to lithium, and is a practical secondary battery compared to prior art.

In the present secondary battery, it is preferable to use as a solid-state electrolyte the sintered body obtained by the method for producing the present ceramic material, preferably as-is, or suitably processed without grinding. Note that a formed compact containing the present ceramic material and other constituents may be obtained using a powder fired in powder state in the second firing step, and this formed compact may serve as the solid-state electrolyte. The method for producing the formed compact may apply methods for producing ceramic formed compact that are well known in prior art. For instance, forming methods such as press method, doctor blade method, roll coater method, and the like, may be given.

The positive electrode and the negative electrode of the present secondary battery can contain a positive electrode active substance and a negative electrode active substance that are well known in prior art and used in lithium secondary batteries, and are prepared by conventional methods.

(Positive Electrode Active Substance)

There is no particular limitation as positive electrode active substance, and positive electrode active substances used in all-solid-state secondary batteries that are well known in prior art can be used. In particular, when a metal oxide is used as a positive electrode active substance, sintering of the secondary battery can be carried out under oxygen atmosphere. As concrete examples of such positive electrode active substances, manganese dioxide ($MnO_2$), iron oxide, copper oxide, nickel oxide, lithium manganese complex oxides (for instance, $Li_xMn_2O_4$ or $Li_xMnO_2$), lithium nickel complex oxides (for instance, $Li_xNiO_2$), lithium cobalt complex oxides (for instance, $Li_xCoO_2$), lithium nickel cobalt complex oxides (for instance, $LiNi_{1-y}Co_yO_2$), lithium manganese cobalt complex oxides (for instance, $LiMn_yCo_{1-y}O_2$), lithium manganese cobalt nickel complex oxides (for instance, $LiMn_xCo_yNi_zO_2$), spinel-type lithium manganese nickel complex oxides (for instance, $Li_xMn_{2-y}Ni_yO_4$), lithium phosphate compounds having an olivine structure (for instance, $Li_xFePO_4$, $Li_xFe_{1-y}Mn_yPO_4$, $Li_xCoPO_4$), lithium phosphate compounds having a nasicon structure (for instance, $Li_xV_2(PO_4)_3$), iron sulfate ($Fe_2(SO_4)_3$), vanadium oxides (for instance, $V_2O_5$), and the like, can be cited. These may be used alone, or may be used by combining two or more species. Note that in these chemical formulae, it is preferable that x and y are in the ranges $1<x<5$ and $0<y<1$. Among these, $LiCoO_2$, $LiNiO_2$, $Li_xV_2(PO_4)_3$, $LiNiPO_4$ and $LiFePO_4$ are preferable. In addition, sulfur or a compound thereof can be used as a positive electrode active substance, and S (sulfur), $Li_2S$ (lithium sulfide), or $Li_2S_n$ (lithium polysulfide) may be given.

(Negative Electrode Active Substance)

There is no particular limitation as negative electrode active substance, and negative electrode active substances used in all-solid-state batteries that are well known in prior art can be used. For instance, carbon, metal lithium (Li), metal compounds, metal oxides, Li metal compounds, Li metal oxides (including lithium-transition metal complex oxides), boron-added carbon, graphite, compounds having a nasicon structure, and the like, can be cited. These may be used alone, or may be used by combining two or more species. For instance, when the above metal lithium (Li) is used, the capacity of the all-solid-state battery can be expanded. As the above-mentioned carbon, carbon materials that are well known in prior art can be cited, such as, for instance, graphite carbon, hard carbon and soft carbon. As the above-mentioned metal compounds, LiAl, LiZn, $Li_3Bi$, $Li_3Cd$, $Li_3Sd$, $Li_4Si$, $Li_{4.4}Pb$, $Li_{4.4}Sn$, $Li_{0.17}C(LiC_6)$, and the like, can be cited. In addition, gold lithium alloy or alloys such as indium lithium can also be cited. As the above-mentioned metal oxides, SnO, $SnO_2$, GeO, $GeO_2$, $In_2O$, $In_2O_3$, PbO, $PbO_2$, $Pb_2O_3$, $Pb_3O_4$, $Ag_2O$, AgO, $Ag_2O_3$, $Sb_2O_3$, $Sb_2O_4$, $Sb_2O_5$, SiO, ZnO, CoO, NiO, $TiO_2$, FeO, and the like, can be cited. As Li metal compounds, $Li_3FeN_2$, $Li_{2.6}Co_{0.4}N$, $Li_{2.6}Cu_{0.4}N$, and the like, can be cited. As Li metal oxides (lithium-transition metal complex oxides), the lithium-titanium complex oxide represented by $Li_4Ti_5O_{12}$, and the like, can be cited. As the above-mentioned boron-added carbon, boron-added carbon, boron-added graphite, and the like, can be cited. Metal lithium is preferred.

Note that in order to obtain a positive electrode and a negative electrode, in addition to each active substance described above, a positive electrode material or a negative electrode material containing suitably an electronic conduction aid or a binder may be prepared beforehand. As electronic conduction aids, for instance, acetylene black, carbon black, graphite, various carbon fibers, carbon nanotube, and the like, may be given. As binders, for instance, polyvinylidene fluoride (PVDF), SBR, polyimide, polytetrafluoroethylene, and the like, may be given. In addition, such various active substances can be used alone or by combining two or more species, in a positive electrode.

The positive electrode and the negative electrode that the present secondary battery is provided with may have any morphology as long as it functions as a secondary battery. It is possible to turn the positive electrode active substance or positive electrode material or the negative electrode active substance or negative electrode material described above into a formed compact using a well known forming method such as press method, doctor blade method or roll coater method. With the press method, a formed compact can be obtained by filling a mold or the like with a positive electrode active substance powder or a negative electrode active substance powder and applying pressure. Meanwhile, with the doctor blade method and the roll coater method, a mixture is obtained first by mixing a positive electrode active substance or a negative electrode active substance and a binder such as polyvinyl alcohol. Note that, a suitable amount of solid-state electrolyte may be added to the mixture, as necessary. Next, an organic solvent such as toluene is added to the obtained mixture to prepare a positive electrode slurry. The prepared positive electrode slurry is formed into a film shape or a sheet shape of a given thickness by a forming method such as doctor blade method or roll coater method. After drying, as necessary by performing processing such as cutting, and by firing, a positive electrode and a negative electrode can be prepared. In addition, a formed compact suitably containing the above various active substances and a powder of the ceramic material of the present invention may serve as the positive electrode and the negative electrode.

A cell of the present secondary battery is fabricated by combining the positive electrode material or positive electrode, the negative electrode material or negative electrode prepared as above with a solid-state electrolyte. While fabrication of the cell is also different depending on the morphology of the battery to be obtained ultimately, for instance, it is possible to provide a positive electrode material on one side of the solid-state electrolyte to serve as the positive electrode, and provide a negative electrode material on the other side of the solid-state electrolyte to serve as the negative electrode, or the like. Note that the cell structure of the present secondary battery is not limited in particular. For instance, it may have various battery morphologies such as, in addition to coin-type, cylinder-type and box-type.

Note that, from what has been explained above, the description herein can also be carried out as a method for producing an all-solid-state lithium secondary battery comprising the step of obtaining a LLZ sintered body by heating the above raw material powder, and the step of fabricating a cell of the above all-solid-state lithium secondary battery by combining with a positive electrode and a negative electrode the sintered body serving as a solid-state electrolyte.

EXAMPLES

Hereafter, the disclosure herein will be described by giving examples. The following examples are for the purpose of explaining the present invention, and are not to limit the present invention.

(Preparation of Raw Materials for Example Sample)

Lithium hydroxide, lanthanum hydroxide (Shin-Etsu Chemical Co., Ltd.), zirconium oxide (Tosoh Corporation) and niobium oxide (Kanto Kagaku) were used as starting raw materials. Powders thereof were weighed so as to have $LiOH:La(OH)_3:ZrO_2:Nb_2O_5=7:3:1.625:0.1875$ respectively in molar ratios. These powders were mixed in an automatic mortar and pestle to obtain a raw material powder. When the mixture of Li, La, Zr and Nb in this raw material powder is represented by a composition formula, it becomes $Li_7La_3Zr_{1.625}Nb_{0.375}O_{12}$.

(Preparation of Raw Materials for Comparative Example 1)

Lithium hydroxide, lanthanum hydroxide (Shin-Etsu Chemical Co., Ltd.) and zirconium oxide (Tosoh Corporation) were used as starting raw materials. Powders thereof were weighed so as to have $LiOH:La(OH)_3:ZrO_2=7:3:2$ respectively in molar ratios. These powders were mixed in an automatic mortar and pestle to obtain the raw material powder of Comparative Example 1.

(First Heat Treatment Step)

The raw material powder of Example Sample and the raw material powder of Comparative Example 1 were respectively heated up in air at 600° C./h and maintained at 900° C. for 6 h.

(Second Heat Treatment Step)

After the earlier heat treatment, the powder after the heat treatment was mixed with stone balls and ground for 3 h using a vibrating mill. After grinding, the present powder was passed through a sieve, then, with respect to the present powder, $\gamma$-$Al_2O_3$ was added at concentrations of 0.6, 0.9, 1.2, 1.5 and 2.1 percent by mass. Note that each of these amounts of $\gamma$-$Al_2O_3$ added corresponds to an amount that gives, in molar ratio with respect to the composition formula $Li_7La_3Zr_{1.625}M_{0.375}O_{12}$ supposing that the primary firing powder has a composition that is the composition as loaded, 0.1 Al, idem 0.15 Al, idem 0.2 Al, idem 0.25 Al, and idem 0.35 Al. In addition, a powder with no γ-$Al_2O_3$ added served as a powder of Comparative Example 2. Note that, in the primary firing powder, due to losses at firing time or the like, it is possible that Li and O have deviated from 7 and 12, which are the number of moles in the load composition.

After these various powders were press-formed using a mold, a pellet thereof was placed on a setter, introduced into a sheath along with the setter, heated up at 200° C./h and maintained in air atmosphere or Ar atmosphere at 1000° C. for 36 h to obtain a sintered body pellet. For the sintered body pellet, once the top and bottom surfaces were polished, structure evaluation and electrochemical measurements were carried out as described below.

(Structure Evaluation)

X-ray diffraction measurement of each pellet was performed. In addition, after the weight of the pellet was measured, the diameter of the pellet was measured at several locations using a micrometer to calculate the mean value, then, the thickness of the pellet was measured similarly to calculate the volume of the pellet, and the density was calculated.

(Li Ion Conductivity Measurement)

Au sputtering was performed on the pellet, which was further vacuum-dried at 110° C. or higher for 5 hours or longer, introduced as-is into an Ar atmosphere glove box, and integrated into a CR2032 coin cell. The present coin cell was taken out into air and alternating current impedance measurement was carried out at 1 MHz to 0.1 Hz frequency and 10 mV voltage using an electrochemical measurements based (potentio-galvanostat frequency response analyzer) manufactured by Solartron.

(Crystal Structure)

A powder X-ray diffraction spectrum was measured in the firing sample for which the raw material starting composition was $Li_7La_3Zr_{1.625}M_{0.375}O_{12}$-0.25Al.

Results for the density and Li ion conductivity are shown in FIG. 1 and Table 1. In addition, a powder X-ray diffraction spectrum is shown in FIG. 2.

density and Li ion conductivity could be obtained in a range with respect to LLZNb (or 3 mol La) of preferably 0.1 Al or more to 0.30 Al or less, more preferably 0.1 Al or more to 0.25 Al or less, even more preferably 0.1 Al or more to 0.20 Al or less, and all the more preferably 0.1 Al or more to 0.15 Al or less. In addition, according to the firing in Ar atmosphere, it was revealed that satisfactory density and Li ion conductivity could be obtained in a range with respect to LLZNb (or 3 mol La) of preferably 0.1 Al or more to 0.35 Al or less, more preferably 0.1 Al or more to 0.30 Al or less, and even more preferably 0.1 Al or more to 0.25 Al or less.

In addition, when the firing samples from air atmosphere and the firing samples from Ar atmosphere were compared, the density and Li ion conductivity were more satisfactory for the firing samples from Ar atmosphere. In addition, it was revealed that high density and Li ion conductivity that were stable in a wider range per amount of Al added could be obtained for the firing samples from Ar atmosphere. In particular, satisfactory density (4.0 or greater, preferably 4.3 or greater) and Li ion conductivity ($7.0 \times 10^{-5}$ S/cm or greater ($6.0 \times 10^{-4}$ S/cm or lower)) could be obtained with a range of 0.1 Al or more to 0.35 Al or less with respect to LLZNb (or 3 mol La), and, more preferably, more satisfactory density (4.5 or greater) and Li ion conductivity ($3.0 \times 10^{-4}$ S/cm or greater, more preferably $4.0 \times 10^{-4}$ S/cm or greater, and even more preferably $4.5 \times 10^{-4}$ S/cm or greater) could be obtained at 0.1 Al or more to 0.25 Al or less.

Figure 2:
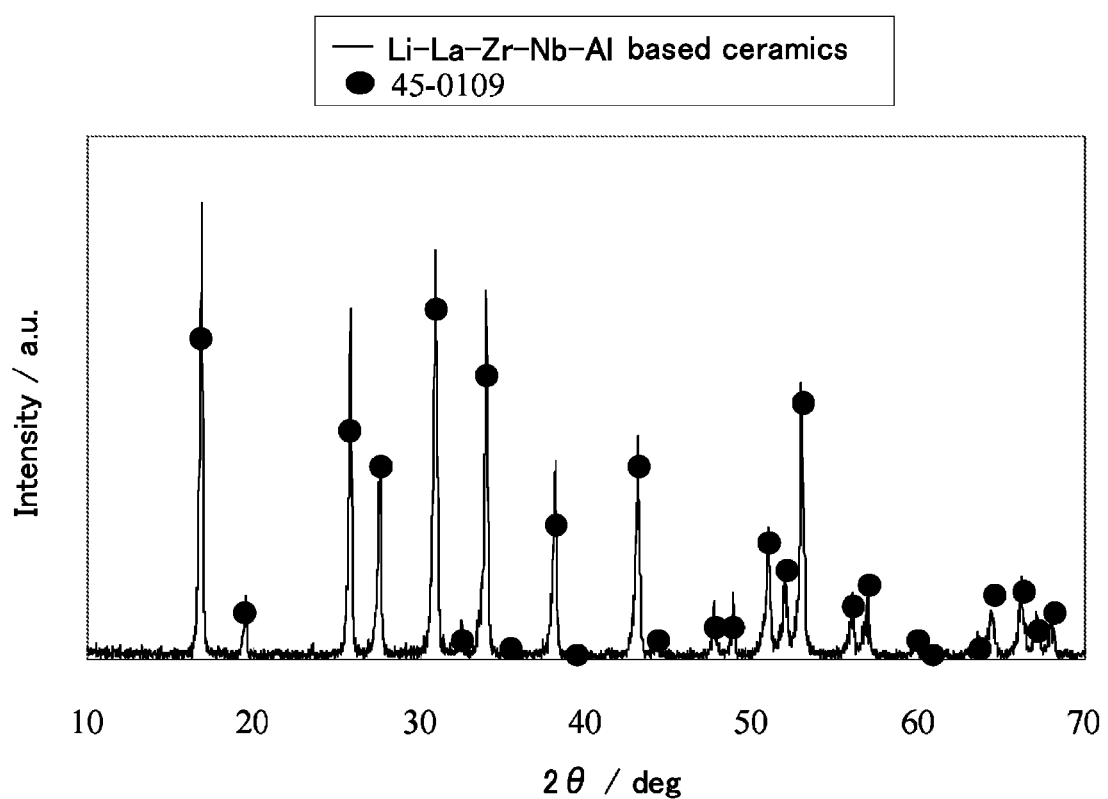
FIG. 2 shows one example of X-ray diffraction spectrum for an Li—La—Zr—Nb—Al based ceramics.

In addition, it was revealed that the firing sample of Example had the characteristics of a LLZ crystal structure from the fact that a similar diffraction pattern to the ICDD powder diffraction file 045-0109 was obtained for the powder X-ray diffraction spectrum of the firing sample which raw material starting composition was $Li_7La_3Zr_{1.625}Nb_{0.375}O_{12}$-0.25Al and fired in Ar atmosphere, as shown in FIG. 2.

(Preparation of Raw Materials)

Lithium hydroxide, lanthanum hydroxide (Shin-Etsu Chemical Co., Ltd.), zirconium oxide (Tosoh Corporation) and tantalum oxide were used as starting raw materials. Powders thereof were blended separately in molar ratios into the

TABLE 1

| | $Li_7La_3Zr_{1.625}Nb_{0.375}O_{12}$-zAl | | | | | |
|---|---|---|---|---|---|---|
| Air atmosphere | z/Al loading amount | 0 | 0.1 | 0.15 | 0.2 | 0.25 | 0.35 |
| | Sintered body density | 3.21 | 4.52 | 4.53 | 4.33 | 4.32 | 4.07 |
| | Ion conductivity | 8.26E−06 | 2.36E−04 | 3.24E−04 | 1.05E−04 | 1.01E−04 | 2.18E−05 |
| Ar atmosphere | z/Al loading amount | 0 | 0.1 | 0.15 | 0.2 | 0.25 | 0.35 |
| | Sintered body density | 3.55 | 4.57 | 4.58 | 4.6 | 4.56 | 4.31 |
| | Ion conductivity | 3.99E−06 | 3.49E−04 | 4.91E−04 | 4.67E−04 | 3.91E−04 | 6.08E−05 |

As shown in FIG. 1 and Table 1, most of the firing samples in air atmosphere and all the firing samples in Ar atmosphere had more elevated Li ion conductivity than the firing samples of Comparative Example 1 which do not contain Nb and Al (conductivity: $2.9 \times 10^{-5}$ S/cm; density: 4.61 g/cm$^3$). All the Example samples had higher densities than the firing samples of Comparative Example 2 which contain Nb but do not contain Al, and the Li ion conductivity was equivalent or greater as well. That is to say, it was revealed that firing while containing Al and at the same time substituting a part of Zr with Nb improved density and Li ion conductivity. According to the firing in air atmosphere, it was revealed that satisfactory following three groups, and mixed in an automatic mortar and pestle to yield raw material powders.

(Composition A)

Weighing was so as to obtain LiOH:La(OH)$_3$:ZrO$_2$:Ta$_2$O$_5$=7:3:1.890:0.055. When the mixture of Li, La, Zr and Ta in this raw material powder is represented by a composition formula, it becomes $Li_7La_3Zr_{1.89}Ta_{0.11}O_{12}$.

(Composition B)

Weighing was so as to obtain LiOH:La(OH)$_3$:ZrO$_2$:Ta$_2$O$_5$=7:3:1.625:0.1875. When the mixture of Li, La, Zr and Ta in this raw material powder is represented by a composition formula, it becomes $Li_7La_3Zr_{1.625}Ta_{0.375}O_{12}$.

(Composition C)

Weighing was so as to obtain $LiOH:La(OH)_3:ZrO_2:Ta_2O_5=7:3:1.440:0.280$. When the mixture of Li, La, Zr and Ta in this raw material powder is represented by a composition formula, it becomes $Li_7La_3Zr_{1.44}Ta_{0.56}O_{12}$.

(First Heat Treatment Step)

Each raw material powder was heated up in air atmosphere at 600° C./h and maintained at 900° C. for 6 h.

(Second Heat Treatment Step)

Each powder among three species after heat treatment was mixed with stone balls and ground for 3 h using a vibrating mill, then, after each powder was passed through a sieve, each powder was added with $\gamma$-$Al_2O_3$ at the following concentrations and mixed.

(Powder After Heat Treatment of Composition A)
0.6, 1.2 and 1.8 percent by mass (Powder After Heat Treatment of Composition B)
0.15, 0.29, 0.58, 0.88, 1.46 and 1.75 percent by mass (Powder After Heat Treatment of Composition C)
0.57, 1.15 and 1.72 percent by mass After these various powders were press-formed using a mold, a pellet thereof was placed on a setter, introduced into a sheath along with the setter, heated up at 200° C./h and maintained in air atmosphere or Ar atmosphere at 1000° C. for 36 h to obtain a sintered body pellet. For the sintered body pellet, the top and bottom surfaces were polished and structure evaluation and the like were carried out similarly to Example 1. The density and Li ion conductivity of the firing sample obtained from each group is shown in Tables 2 to 4 and FIG. 3. In addition, a powder X-ray diffraction spectrum of the firing sample for which the raw material starting composition was $Li_7La_3Zr_{1.625}Ta_{0.375}O_{12}$-0.25Al and fired in Ar atmosphere is shown in FIG. 4.

TABLE 2

$Li_7La_3Ze_{1.89}Ta_{0.11}O_{12}$-zAl

| | | | | |
|---|---|---|---|---|
| Air atmosphere | z/Al loading amount | 0.1 | 0.2 | 0.3 |
| | Sintered body density | 4.28 | 4.33 | 4.21 |
| | Ion conductivity | 1.17E−05 | 1.90E−05 | 2.68E−06 |
| Ar atmosphere | z/Al loading amount | 0.1 | 0.2 | 0.3 |
| | Sintered body density | 4.88 | 4.6 | 4.63 |
| | Ion conductivity | 2.86E−04 | 2.42E−04 | 1.86E−04 |

TABLE 3

$Li_7La_3Zr_{1.625}Ta_{0.375}O_{12}$-zAl

| | | | | | | | |
|---|---|---|---|---|---|---|---|
| Air atmosphere | z/Al loading amount | 0.025 | 0.05 | 0.1 | 0.15 | 0.25 | |
| | Sintered body density | 4.76 | 4.8 | 4.68 | 4.55 | 4.41 | |
| | Ion conductivity | 2.88E−04 | 3.02E−04 | 2.32E−04 | 1.20E−04 | 3.66E−05 | |
| Ar atmosphere | z/Al loading amount | 0 | 0.025 | 0.05 | 0.1 | 0.15 | 0.25 | 0.3 |
| | Sintered body density | 3.68 | 5.07 | 5.06 | 4.99 | 4.86 | 4.8 | 4.86 |
| | Ion conductivity | 6.16E−06 | 7.96E−04 | 6.36E−04 | 8.73E−04 | 7.87E−04 | 8.14E−04 | 8.39E−04 |

TABLE 4

$Li_7La_3Zr_{1.44}Ta_{0.56}O_{12}$-zAl

| | | | | |
|---|---|---|---|---|
| Air atmosphere | z/Al loading amount | 0.1 | 0.2 | 0.3 |
| | Sintered body density | 4.88 | 4.76 | 4.65 |
| | Ion conductivity | 2.22E−04 | 2.32E−04 | 1.81E−04 |
| Ar atmosphere | z/Al loading amount | 0.1 | 0.2 | 0.3 |
| | Sintered body density | 5.06 | 4.99 | 4.94 |
| | Ion conductivity | 4.21E−04 | 4.94E−04 | 5.00E−04 |

Figure 3:
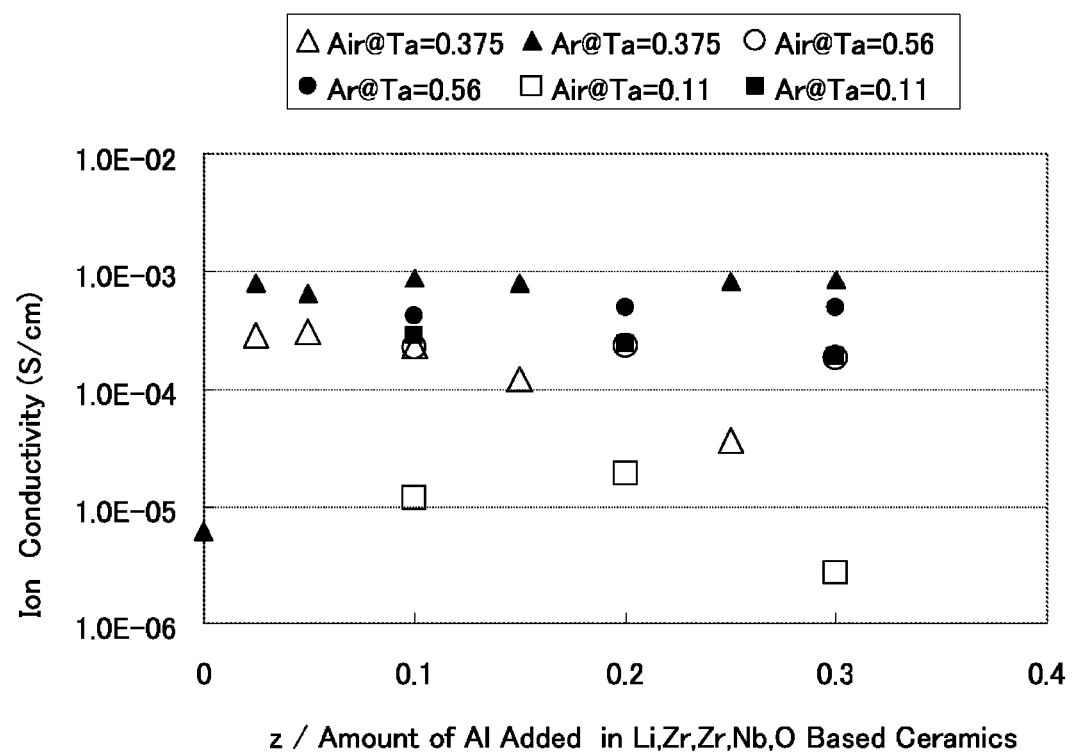
FIG. 3 shows the evaluation results for the dependencies on the amount of Al added and firing atmosphere in an Li—La—Zr—Ta—Al based ceramics.
Figure 4:
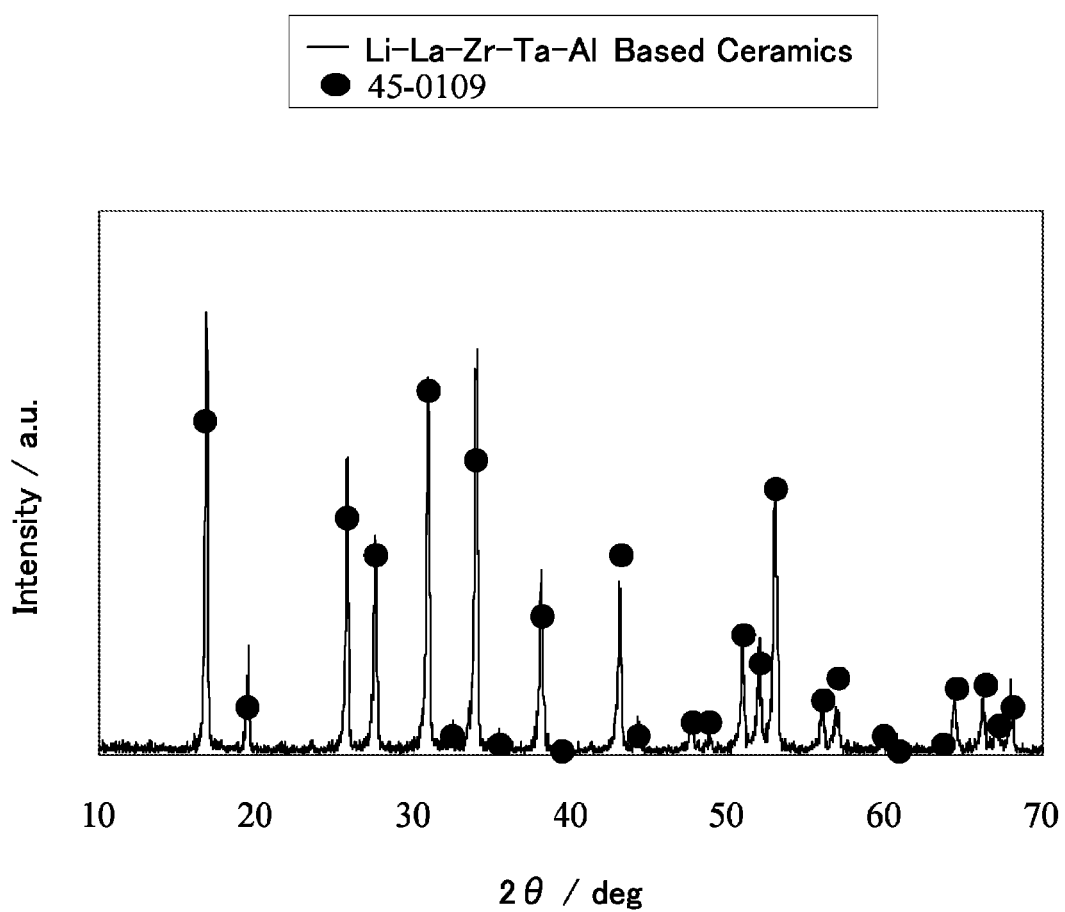
FIG. 4 shows one example of X-ray diffraction spectrum for an Li—La—Zr—Ta—Al based ceramics.

As shown in Table 2 to Table 4 and FIG. 3, the density and Li ion conductivity increased in most of the sintered body samples except some. In addition, most firing samples from Example had more elevated Li ion conductivity and density than the firing samples of Comparative Example 1 which do not contain Nb and Al. In particular, the firing samples from air atmosphere and the firing samples from Ar atmosphere were compared additionally, the density and Li ion conductivity were more satisfactory for the firing samples from Ar atmosphere.

In particular, according to the firing in air atmosphere, 0.025 Al or more to 0.30 Al or less with respect to LLZTa (or 3 mol La) is preferable. In addition, according to the firing in Ar atmosphere, 0.025 Al or more to 0.30 Al or less with respect to LLZTa (or 3 mol La) is preferable.

In addition, in the present Example as well, when the firing samples from air atmosphere and the firing samples from Ar atmosphere were compared, the density and Li ion conductivity were more satisfactory for the firing samples from Ar atmosphere. In addition, it was revealed that high density and Li ion conductivity that were stable in a wider range per amount of Al added could be obtained for the firing samples from Ar atmosphere. In particular, satisfactory density (4.5 or greater) and Li ion conductivity ($6.0 \times 10^{-4}$ S/cm or greater) could be obtained with a range of 0.025 Al or more to 0.30 Al or less with respect to LLZTa (or 3 mol La) for the firing samples of the B group from Ar atmosphere firing. In addition, satisfactory density (4.5 or greater) and Li ion conductivity ($4.0 \times 10^{-4}$ S/cm or greater) could be obtained with a range of 0.01 Al or more to 0.30 Al or less with respect to LLZTa (or 3 mol La) for the firing samples of C group from Ar atmosphere firing.

In addition, it was revealed that the firing sample of Example had the characteristics of an LLZ crystal structure from the fact that a similar diffraction pattern to the ICDD powder diffraction file 045-0109 was obtained for the powder X-ray diffraction spectrum of the firing sample which raw material starting composition was $Li_7La_3Zr_{1.625}Ta_{0.375}O_{12}$-0.25Al, as shown in FIG. 4.

Representative, non-limiting examples of the present invention have been described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved ceramic material, as well as methods for preparing the same, and secondary battery using the same.

Moreover, combinations of features and steps disclosed in the above detail description may not be necessary to practice the invention in the broadest sense, and are instead taught merely to particularly describe representative examples of the invention. Furthermore, various features of the above-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A sintered body comprising:
    a ceramic material having a formula of $Li_{7-y}La_3Zr_{2-y}M_yO_{12}$-zAl
        wherein M represents Nb and/or Ta,
        wherein y represents a total number of moles of Nb and Ta, and
        wherein z represents 0.025-0.35 moles,
    wherein a molar ratio (Nb+Ta)/La is 0.03 or greater to 0.20 or lower, and
    wherein a molar ratio of La to Zr and M (La: (Zr+M)) is 3:2,
    the sintered body having a garnet-type or garnet-like crystal structure, a Li ion conductivity of not less than $3.0*10^{-5}$ S/cm, and a density of not less than 4.0 g/cm$^3$.

2. The sintered body according to claim 1, wherein the ceramic material includes a combination described in any of (a) to (c) below:
    (a) a combination of Li, La, Zr, Nb, O, and Al,
    (b) a combination of Li, La, Zr, Ta, O, and Al,
    (c) a combination of Li, La, Zr, Nb, Ta, O and Al.

3. The sintered body according to claim 1, which is a solid-state electrolyte material having Li ion conductivity.

4. An all-solid-state secondary battery using the ceramic material according to claim 1.

5. An air secondary battery using the ceramic material according to claim 1.

6. A lithium ion secondary battery using the ceramic material according to claim 1.

* * * * *

UNITED STATES PATENT AND TRADEMARK OFFICE
CERTIFICATE OF CORRECTION

| | |
|---|---|
| PATENT NO. | : 8,841,033 B2 |
| APPLICATION NO. | : 12/873393 |
| DATED | : September 23, 2014 |
| INVENTOR(S) | : Yoshihiko Yamamura et al. |

It is certified that error appears in the above-identified patent and that said Letters Patent is hereby corrected as shown below:

Title Page, Item (73) Assignee

Please correct: "NGK Insulators, Ltd., Nayoga (JP)" to -- NGK Insulators, Ltd., Nagoya (JP) --

Signed and Sealed this
Seventeenth Day of February, 2015

Michelle K. Lee
*Deputy Director of the United States Patent and Trademark Office*